United States Patent
Holstein et al.

(10) Patent No.: US 8,939,647 B2
(45) Date of Patent: Jan. 27, 2015

(54) RADIAL BEARING FOR MOUNTING A SHAFT

(75) Inventors: Benjamin Holstein, Heidenheim (DE); Jorg Lochschmidt, Ulm (DE)

(73) Assignee: Voith Patent GmbH, Heidenheim (DE)

( * ) Notice: Subject to any disclaimer, the term of this patent is extended or adjusted under 35 U.S.C. 154(b) by 0 days.

(21) Appl. No.: 13/880,349

(22) PCT Filed: Dec. 7, 2011

(86) PCT No.: PCT/EP2011/006114
§ 371 (c)(1),
(2), (4) Date: Aug. 22, 2013

(87) PCT Pub. No.: WO2012/095131
PCT Pub. Date: Jul. 19, 2012

(65) Prior Publication Data
US 2013/0322795 A1    Dec. 5, 2013

(30) Foreign Application Priority Data

Dec. 10, 2010 (DE) .......................... 10 2010 054 106

(51) Int. Cl.
*F16C 32/06* (2006.01)
*F16C 23/00* (2006.01)
(Continued)

(52) U.S. Cl.
CPC .............. *F16C 17/02* (2013.01); *F16C 17/022* (2013.01); *F16C 33/046* (2013.01); *F16C 33/08* (2013.01); *F16C 33/1075* (2013.01); *F16C 33/108* (2013.01)
USPC ............................ 384/263; 384/117; 384/252

(58) Field of Classification Search
CPC ........ F16C 17/028; F16C 17/12; F16C 17/06; F16C 32/0666; F16C 33/046; F16C 33/08; F16C 35/02
USPC ......... 384/192, 202, 247, 252, 258, 261, 263, 384/265, 266, 267, 268, 269, 270, 276, 117
See application file for complete search history.

(56) References Cited

U.S. PATENT DOCUMENTS 2,256,647 A    9/1941 Merrill
4,300,808 A *  11/1981 Yoshioka ...................... 384/312
(Continued)

FOREIGN PATENT DOCUMENTS

DE    195 25 575    2/1996
GB    604196        6/1948
(Continued)

OTHER PUBLICATIONS

English translation of International Preliminary Report on Patentability re International Application No. PCT/EP2011/006114.

*Primary Examiner* — Alan B Waits
(74) *Attorney, Agent, or Firm* — Farjami & Farjami LLP

(57) ABSTRACT

The invention relates to a radial bearing for mounting a shaft, comprising the following features:
   several bearing shells which are curved according to the radius of the shaft and whose inner surface forms the plain bearing surfaces;
   a housing enclosing the bearing shells;
   at least one of the end regions of the respective bearing shell as seen in the circumferential direction is held in an interlocking manner on the housing in such a way that expansion and/or displacement of the end region or the entire bearing shell is possible;
   means for setting the curvature of the individual bearing shell.

12 Claims, 3 Drawing Sheets

(51) Int. Cl.
  *F16C 25/00*  (2006.01)
  *F16C 17/02*  (2006.01)
  *F16C 33/04*  (2006.01)
  *F16C 33/08*  (2006.01)
  *F16C 33/10*  (2006.01)

(56) References Cited

U.S. PATENT DOCUMENTS 4,335,925 A * 6/1982 Stopp .......................... 384/125
4,913,563 A * 4/1990 Veronesi et al. ............. 384/312
5,603,574 A * 2/1997 Ide et al. ...................... 384/117
8,308,364 B2 * 11/2012 Tecza et al. .................... 384/99
2002/0054718 A1   5/2002 Weissert
2004/0240759 A1  12/2004 Swann
2006/0078239 A1   4/2006 Dimofte

FOREIGN PATENT DOCUMENTS

JP          55135225 A * 10/1980 .............. F16C 17/03
WO       WO 97/38899      10/1997

* cited by examiner

RADIAL BEARING FOR MOUNTING A SHAFT

This is a U.S. national phase application, which is based on, and claims priority from, PCT application Serial No. PCT/EP2011/006114, filed Dec. 7, 2011, which claims priority from foreign application Serial No. 10 2010 054 106.0, filed Dec. 10, 2010, in Germany.

The invention relates to a bearing for mounting a shaft in the radial direction. Such bearings are known in a large number of varieties.

In the present case, a bearing with a housing is concerned which is lined with bearing shells. There are bearing shells which represent closed bushings. There are also linings consisting of several shells, which respectively represent segments and which are joined into a more or less closed ring within the housing.

The invention is based on such segment bearing shells. The individual segments are fixed to the inside surface of the housing, e.g. by gluing or screwing, and therefore in a non-positive way.

This leads to numerous disadvantages. One important disadvantage lies in the type of fixing itself. As a result, gluing is often not durable. Screwed joints can also loosen over time. Moreover, the bearing clearance and the segment shell curvature cannot be adjusted, so that optimal lubrication is not ensured.

The invention is based on the object of providing a radial bearing which comprises plain bearing areas formed by segment shells, in which the bearing clearance and the segment shell curvature are adjustable and which has a mechanically simple configuration.

This object is achieved by the features of claim 1.

The interlocked fixing of the bearing shells in accordance with the invention allows a certain expansion and/or displacement of at least the end region of the individual shells. This property plays a role in the adjustment of the segments. The curvature and the position of the shelves relative to the shaft can be adjusted. For this purpose, a packing plate or a comparable spacer element of selected thickness can be inserted between the individual shells and the housing. This preferably occurs between the two ends of the respective shell, as seen in the circumferential direction, preferably in the middle region. Alternatively, a shell holder or a comparable clamping or holding element which fixes the shell in relation to the housing can be guided from the outside through the housing and also through the respective shell. The segment shell curvature and the bearing clearance can be set with the shell holders or comparable clamping or holding means in combination with respective spacer elements. A certain flexibility of the shell is of decisive importance in this respect. This flexibility allows that the segment shell curvature can be varied during mounting by clamping or holding elements between the shell and the housing in combination with respective spacer elements between the shell and housing. As a result, the bearing shells will be brought to their respective shape relevant for the bearing function only during mounting. This procedure offers the possibility to reduce the precision requirements in segment production and to subsequently adjust the bearings after a certain operating time in a simple way.

The invention is shown in closer detail in the drawings, which show the following in detail:

Figure 1:
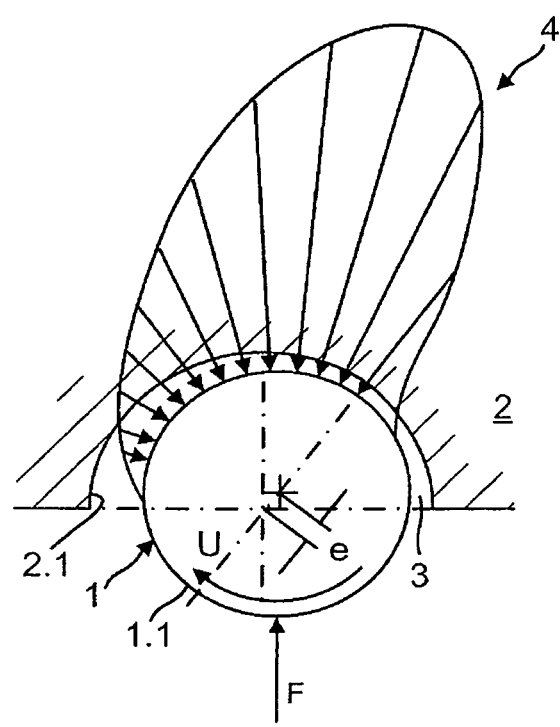
FIG. 1 shows a schematic illustration of an axial sectional view through a radial bearing with an adjusting device for varying the curvature of a bearing shell.

FIG. 1 shows a housing 5 with a completely shown shell 2, adjacent to which there are two further shells 2 on either side, which are only partly shown here.

An adjusting device 7 is provided for setting the curvature of the shell 2. It comprises a pin 7.1, at the radially inner end of which a bar 7.2 is provided. The bar 7.2 is embedded in the material of the shell 2. The pin 7.1 protrudes beyond the radially outer jacket surface of the housing 5. It carries a thread there, onto which a nut 7.3 is screwed. The radial position of the bar 7.2 can be varied by means of the nut 7.3. The curvature of the shell 2 can be adjusted in this way. The adjusting device fulfils both the function of the spacer element and also the function of the clamping or holding element.

The device for adjusting the curvature of the bearing shell is preferably located in the centre between the two circumferential ends of the respective bearing shell.

Figure 2:
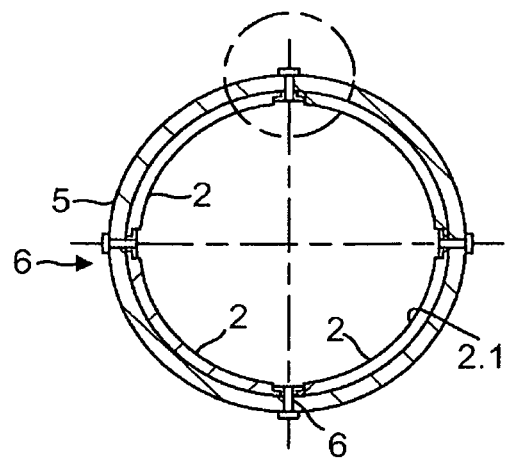
FIG. 2 shows the hydrodynamic pressure buildup in a cylindrical plain bearing.

FIG. 2 shows a revolving shaft 1. It is held by a plain bearing 2. A bearing clearance 3 is disposed between the two which is formed by the jacket surface 1.1 of the shaft and the bearing surface 2.1 of the bearing.

FIG. 1 shows a revolving shaft 1. It is mounted by a plain bearing 2. A bearing clearance 3 is disposed between the two, which is formed by the outer surface 1.1 of the shaft and the bearing surface 2.1 of the bearing.

The bearing clearance 3 tapers during the rotation of the shaft 1 in the circumferential direction U. A pressure field 4 is built up over the bearing clearance. It leads to an eccentricity e of the shaft 1 relative to the bearing 2.

Figure 3:
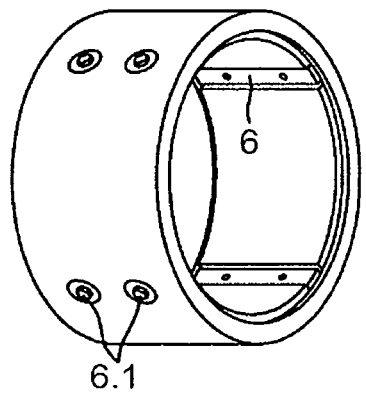
FIG. 3 shows a shaft with a bearing in accordance with the invention in an axially perpendicular sectional view.
Figure 4:
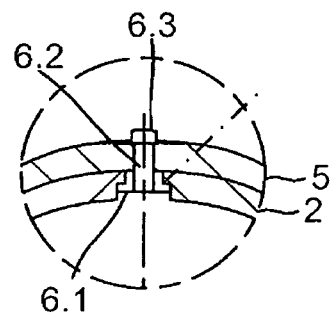
FIG. 4 shows the subject matter of FIG. 2 in a perspective view.

The radial bearing in accordance with the invention and according to FIGS. 2 and 3 comprises a number of bearing shells 2 with bearing surfaces 2.1. The bearing shells can consist of any material, e.g. plastic or metal. Polyurethane or any other polymer is suitable as a bearing material in configurations that use synthetic material.

The bearing shells 2 are made of a solid sleeve which was subdivided after production into the segments that are shown here.

The bearing shells are enclosed by a housing 5 which consists of steel for example.

Shell holders 6 are provided as clamping or holding elements for fixing the bearing shells 2 to the housing. They comprise a holding strip 6.1 which extends over the axial length of the bearing shells and which engages into recesses of the mutually adjacent bearing shells. The depth of the recess and thickness of the holding strip 6.1 are dimensioned in such a way that the inside surface of the holding strip 6.1 is flush with the bearing surface 2.1.

Each shell holder 6 further comprises a plurality of holding pins 6.2. They are guided through the housing 5 and through the bearing shell 2 and fixed to holding strips 6.1. They protrude beyond the outer jacket surface of the housing 5. They comprise a thread with which a screw 6.3 is screwed together.

Generally, the shell holder 6 will consist of metal. The holding strip 6.1 can consist of a composite material, the radially inner region of which is made of the same or a similar material as the bearing shell 2.

Figure 5:
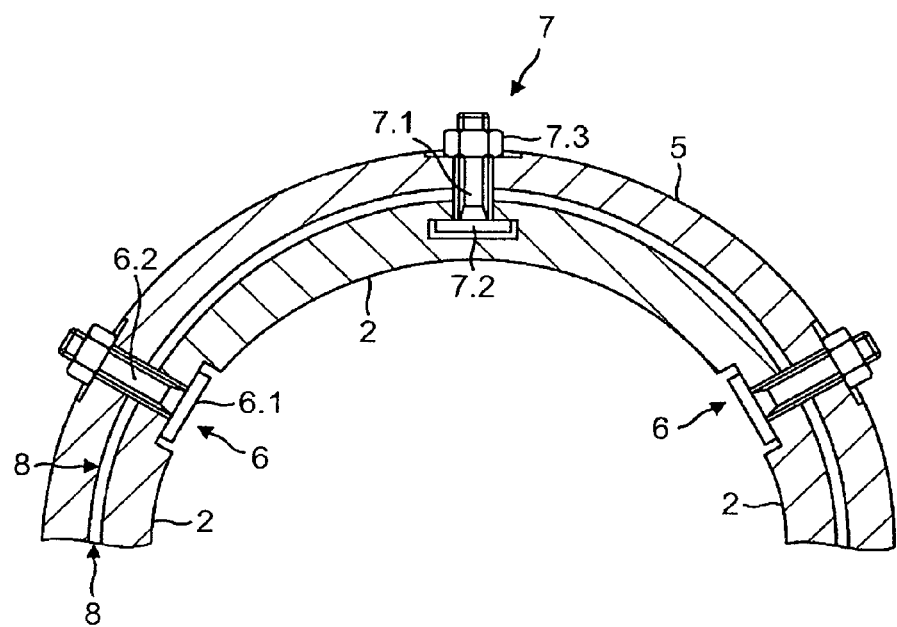
FIG. 5 shows a section of the subject matter of FIG. 2.

As is shown in the sectional view according to FIG. 5, the fixing of the bearing shells 2 on the housing 5 is provided by means of interlocking. It allows a certain displacement or movement of the individual bearing shell 2.

The curvature of the individual bearing shell 2 is variable. For this purpose, a packing plate or a strip of another material (not shown) can be inserted as a spacer element between the bearing shell 2 and the housing 5. The bearing shell 2 is preferably mounted at virtually three points, as seen in an axially perpendicularly sectional view: on the one hand, at both of its ends (as seen in the circumferential direction) by means of the shell holder 6, and on the other hand in a middle region by the packing plate.

FIG. 5 further shows that the holding strip 6.1 is offset relative to the inner jacket surface of the bearing shell 2. It therefore has a distance from the jacket surface of the shaft (not shown) in order to avoid contact with said shaft.

FIG. 5 again shows a housing 5 with a completely shown shell 2, adjacent to which there are two further shells 2 on either side, which are only partly shown here.

An adjusting device 7 is provided for setting the curvature of the shell 2. It comprises a pin 7.1, at the radially inner end of which a bar 7.2 is provided. The bar 7.2 is embedded in the material of the shell 2. The pin 7.1 protrudes beyond the radially outer jacket surface of the housing 5. It carries a thread there, onto which a nut 7.3 is screwed. The radial position of the bar 7.2 can be varied by means of the nut 7.3. The curvature of the shell 2 can be adjusted in this way. The adjusting device fulfils both the function of the spacer element and also the function of the clamping or holding element. In addition, a spacer element 8 is provided between the individual shells and the housing.

LIST OF REFERENCE NUMERALS

1 Shaft
1.1 Jacket surface of the shaft
2 Bearing, bearing shell
2.1 Bearing surface
3 Bearing clearance
4 Pressure field
5 Housing
6 Shell holder
6.1 Holding strip
6.2 Holding pin
6.3 Screw
7 Adjusting device
7.1 Adjusting pin
7.2 Bar
7.3 Nut
8 Spacer element

The invention claimed is:

1. A radial bearing for mounting a shaft, the radial bearing comprising:
   a plurality of bearing shells curved according to a radius of the shaft, wherein inner surfaces of the plurality of bearing shells form plain bearing surfaces, wherein each of the plurality of bearing shells forms a single plain bearing surface;
   a housing enclosing the plurality of bearing shells, wherein the housing comprises an inner jacket surface and an outer jacket surface;
   each of the plurality of bearing shells is clamped to the housing at least at two circumferential ends of each of the plurality of bearing shells;
   a bar embedded in the each of the plurality of bearing shells;
   an adjusting pin guided through the housing, the adjusting pin having a radially inner end on the bar and an engagement element for displacing the adjusting pin and the bar at a radially outer end of the adjusting pin.

2. The radial bearing according to claim 1, wherein the plurality of bearing shells comprise at least one of plastic, and metal.

3. The radial bearing according to claim 2, further comprising:
   a shell holder for touching points of each two mutually adjacent bearing shells of the plurality of the bearing shells;
   wherein each of the shell holders comprises a holding strip extending over an axial length of the radial bearing and is inserted into recesses of the plurality of bearing shells;
   each of the holding strips is fixed to a holding pin, each of the holding pins being guided through a thickness of at least one of the plurality of bearing shells and through the housing and fixed to the outer jacket surface of the housing.

4. The radial bearing according to claim 3, wherein radially inner surfaces of the holding strips lie radially outside of inner jacket surfaces of the plurality of bearing shells.

5. The radial bearing according to claim 2, wherein the plurality of bearing shells are brought to a final shape for a bearing function only during mounting.

6. The radial bearing according to claim 5, further comprising:
   a shell holder for touching points of each two mutually adjacent bearing shells of the plurality of the bearing shells;
   wherein each of the shell holders comprises a holding strip extending over an axial length of the radial bearing and is inserted into recesses of the plurality of bearing shells;
   each of the holding strips is fixed to a holding pin, each of the holding pins being guided through a thickness of at least one of the plurality of bearing shells and through the housing and fixed to the outer jacket surface of the housing.

7. The radial bearing according to claim 6, wherein radially inner surfaces of the holding strips lie radially outside of inner jacket surfaces of the plurality of bearing shells.

8. The radial bearing according to claim 5, wherein the plurality of bearing shells are mounted using at least one spacer element and at least one of a clamping and a holding element, a slackness and the curvature of each of the plurality of bearing shells being set during mounting via a position and a selection of the spacer and at least one of the clamping and holding element.

9. The radial bearing according to claim 8, further comprising:
   a shell holder for touching points of each two mutually adjacent bearing shells of the plurality of the bearing shells;
   wherein each of the shell holders comprises a holding strip extending over an axial length of the radial bearing and is inserted into recesses of the plurality of bearing shells;
   each of the holding strips is fixed to a holding pin, each of the holding pins being guided through a thickness of at least one of the plurality of bearing shells and through the housing and fixed to the outer jacket surface of the housing.

10. The radial bearing according to claim 9, wherein radially inner surfaces of the holding strips lie radially outside of inner jacket surfaces of the plurality of bearing shells.

11. The radial bearing according to claim 1, further comprising:
- a shell holder for touching points of each two mutually adjacent bearing shells of the plurality of the bearing shells;
- wherein each of the shell holders comprises a holding strip extending over an axial length of the radial bearing and is inserted into recesses of the plurality of bearing shells;
- each of the holding strips is fixed to a holding pin, each of the holding pins being guided through a thickness of at least one of the plurality of bearing shells and through the housing and fixed to the outer jacket surface of the housing.

12. The radial bearing according to claim 11, wherein radially inner surfaces of the holding strips lie radially outside of inner jacket surfaces of the plurality of bearing shells.

* * * * *